United States Patent
Vicente et al.

(10) Patent No.: US 6,788,512 B2
(45) Date of Patent: Sep. 7, 2004

(54) ELECTRONIC TRIP UNIT CAPABLE OF ANALOG AND DIGITAL SETTING OF CIRCUIT BREAKER SETPOINTS

(75) Inventors: Nataniel B. Vicente, Bristol, CT (US); Christopher Schnabel, Poughkeepsie, NY (US); Mark Fredrick Culler, Kensigton, CT (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/063,371

(22) Filed: Apr. 16, 2002

(65) Prior Publication Data

US 2003/0193767 A1 Oct. 16, 2003

(51) Int. Cl.[7] .............................................. H02H 3/08
(52) U.S. Cl. ...................... 361/93.1; 361/93.6; 700/293
(58) Field of Search ............................. 361/93.1, 93.2, 361/93.3, 93.5, 93.6, 94, 95, 97, 18, 93.7, 115; 700/293, 296, 292, 297

(56) References Cited

U.S. PATENT DOCUMENTS

| | | | |
|---|---|---|---|
| 4,351,012 A | * | 9/1982 | Elms et al. .................... 361/96 |
| 4,689,712 A | | 8/1987 | Demeyer ...................... 361/96 |
| 5,019,956 A | | 5/1991 | Nakayama et al. ............ 363/50 |
| 5,185,705 A | * | 2/1993 | Farrington ................... 700/292 |
| 5,821,485 A | | 10/1998 | Singer et al. .................. 200/17 |
| 5,943,201 A | | 8/1999 | Walker et al. ................ 361/64 |
| 6,067,218 A | | 5/2000 | Suptitz ......................... 361/97 |
| 6,078,489 A | | 6/2000 | Messerli et al. ............... 361/87 |
| 6,178,513 B1 | | 1/2001 | Lee ............................. 713/300 |

* cited by examiner

Primary Examiner—Rajnikant B Patel
(74) Attorney, Agent, or Firm—Cantor Colburn LLP

(57) ABSTRACT

A trip unit is provided with a microcontroller and non-volatile memory, such as EEPROM (Electrically Erasable Programmable Read Only Memory) or Flash memory, for storing trip setting values, including initializing parameters, boot code, and operational parameters being capable of analog or digital programming depending on a switching instruction. This configuration enables one to change the trip unit's trip setting values after it is manufactured either remotely or locally. The present invention provides thus increased functionality to trip units by enabling upgrades and servicing of the trip unit by downloading replacement trip setting values to it and having multiple operational parameters (trip setting values) available. This would include locally altering trip setting values and remotely downloading trip setting values when the electronic trip unit is connected to a host controller, such as a multi-purpose computer either directly, over the telephone lines, LAN or any other suitable connection such as the Internet.

42 Claims, 3 Drawing Sheets

ELECTRONIC TRIP UNIT CAPABLE OF ANALOG AND DIGITAL SETTING OF CIRCUIT BREAKER SETPOINTS

BACKGROUND OF INVENTION

Electronic trip units (trip units) for actuating the separable contacts in a circuit breaker are well known. An electronic trip unit typically comprises current sensors and may include voltage sensors that provide analog signals indicative of the power line signals. The analog signals are converted by an A/D (analog/digital) converter to digital signals that are processed by a microcontroller. The trip unit further includes RAM (random access memory), ROM (read only memory) and EEPROM (electronic erasable programmable read only memory) all of which interface with the microcontroller. The ROM includes trip unit application code, e.g., main functionality trip setting values, including initializing parameters, boot code, and operational parameters (e.g., trip setting instructions). Operational parameters for the application code are also stored in the EEPROM. An output of the electronic trip unit actuates a trip module, such as a solenoid that trips a mechanical operating mechanism. The mechanical operating mechanism, in turn, separates a pair of main contacts within the circuit breaker. When the contacts open, circuit current is prevented from flowing from one contact to the other, and electrical current is prevented from flowing to a load that is connected to the breaker. The electronic trip unit initiates a trip for instantaneous, short time, long time, ground fault and manual conditions.

Circuit Breakers having electronic trip units are described in U.S. Pat. No. 4,672,501 entitled "Circuit Breaker and Protective Relay Unit". Such trip units often include a keypad along with a display for accessing the processor and for entering and changing the trip unit settings. One such circuit breaker having a keypad and display is described within U.S. Pat. No. 4,870,531 entitled "Circuit Breaker With Removable Display & Keypad".

Remote setting of a circuit breaker is desirable to customers who would like to be able to adjust set points of multiple breakers from a single workstation. One such circuit breaker having a local keypad and display with remote setting capability is described within U.S. Pat. No. 5,019,956 entitled "Power Control Apparatus." However, the circuit breaker described in U.S. Pat. No. 5,019,956 does not display the settings if there is no power to the trip unit.

SUMMARY OF INVENTION

The above discussed and other drawbacks and deficiencies are overcome or alleviated by a trip unit including a sensor for sensing a condition of a circuit providing electricity to a load and a signal converter for converting signals generated by the sensor into a digital value indicative of the condition, and further comprising: a first storage device including a first trip setting value stored therein; a second storage device including a second trip setting value stored therein; a switch for selecting from the first and second trip setting values; and a microcontroller including an output generating a trip signal in response to the digital value indicative of the condition in the circuit and one of the first and second trip setting values selected by the switch.

BRIEF DESCRIPTION OF DRAWINGS

Referring to the exemplary drawings wherein like elements are numbered alike in the several FIGURES.

DETAILED DESCRIPTION

Figure 1:
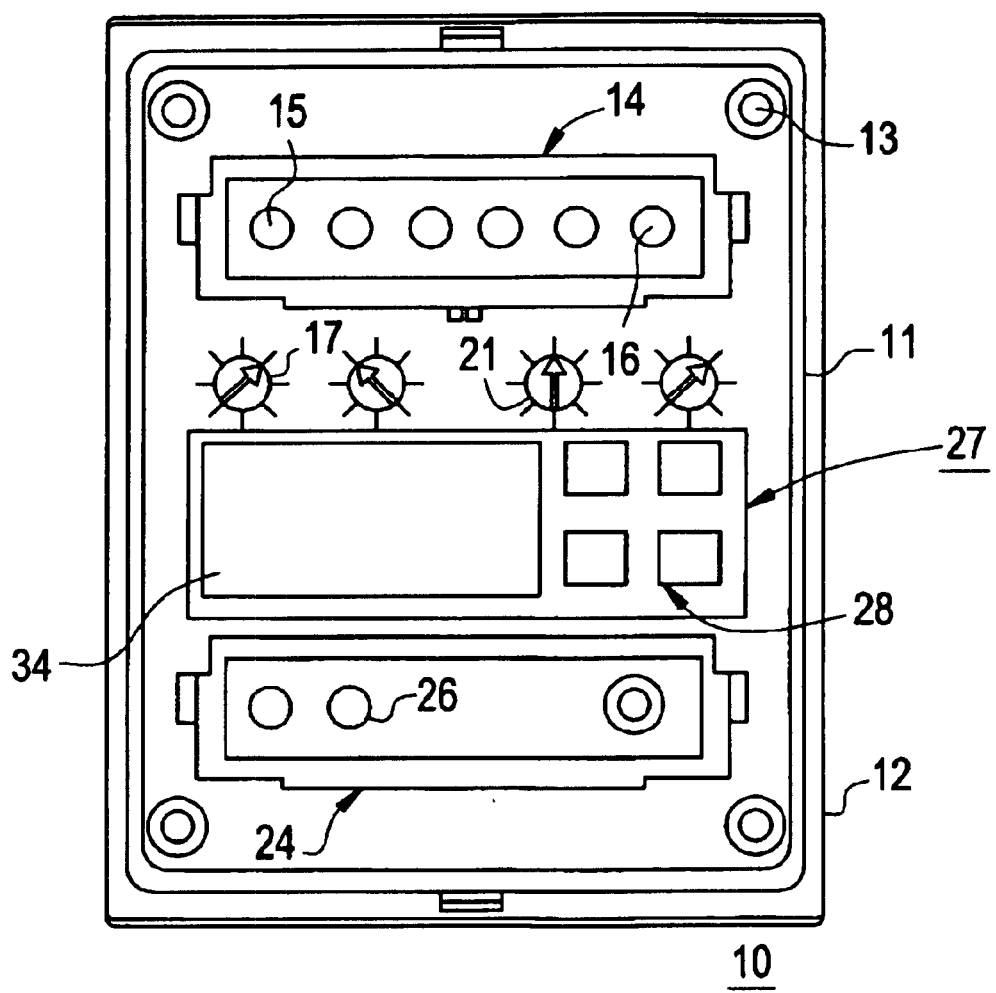
FIG. 1 is a front plan view of a circuit breaker trip unit.

A circuit breaker electronic trip unit 10 similar to that used within the circuit breaker described within the aforementioned U.S. Pat. No. 4,672,501 is depicted in FIG. 1 and includes a cover 11 that is attached to a case 12 by means of screws 13. A plug-in indicator unit 14 is employed to display the condition of the contacts within an associated circuit breaker (not shown). Indicating diodes 15 as well as target indicators 16 provide such visual indication to an operator in lieu of the display arrangement described in the aforementioned U.S. Pat. No. 4,870,531. A first set of knobs 17 are used to enter the long time and short time overcurrent protection settings within the trip unit printed circuit board (not shown) while a second knob 21 is used to set the trip unit short circuit ratings. Knobs 17 and 21 are collectively referred to as analog dials shown generally at 23 in FIG. 2. A plug-in type rating plug 24 such as described in U.S. Pat. No. 4,649,455 entitled "Rating Plug for Molded Case Circuit Breaker" and U.S. Pat. No. 5,027,091 entitled "Molded Case Circuit Interrupter Rating Plug Keying and Interlock Arrangement" is used to set the circuit breaker trip unit ampere rating. Switches 26 are used to actuate the trip unit for ground fault determination in the manner described within U.S. patent application Ser. No. 08/767,748 entitled "Ground Fault Rating Plug for Molded Case Circuit Breakers." Trip unit 10 further comprises a keypad unit that is generally shown at 27 having a keypad 28 that includes 4 keys for setting the trip unit settings aforementioned and a display 34.

Figure 2:
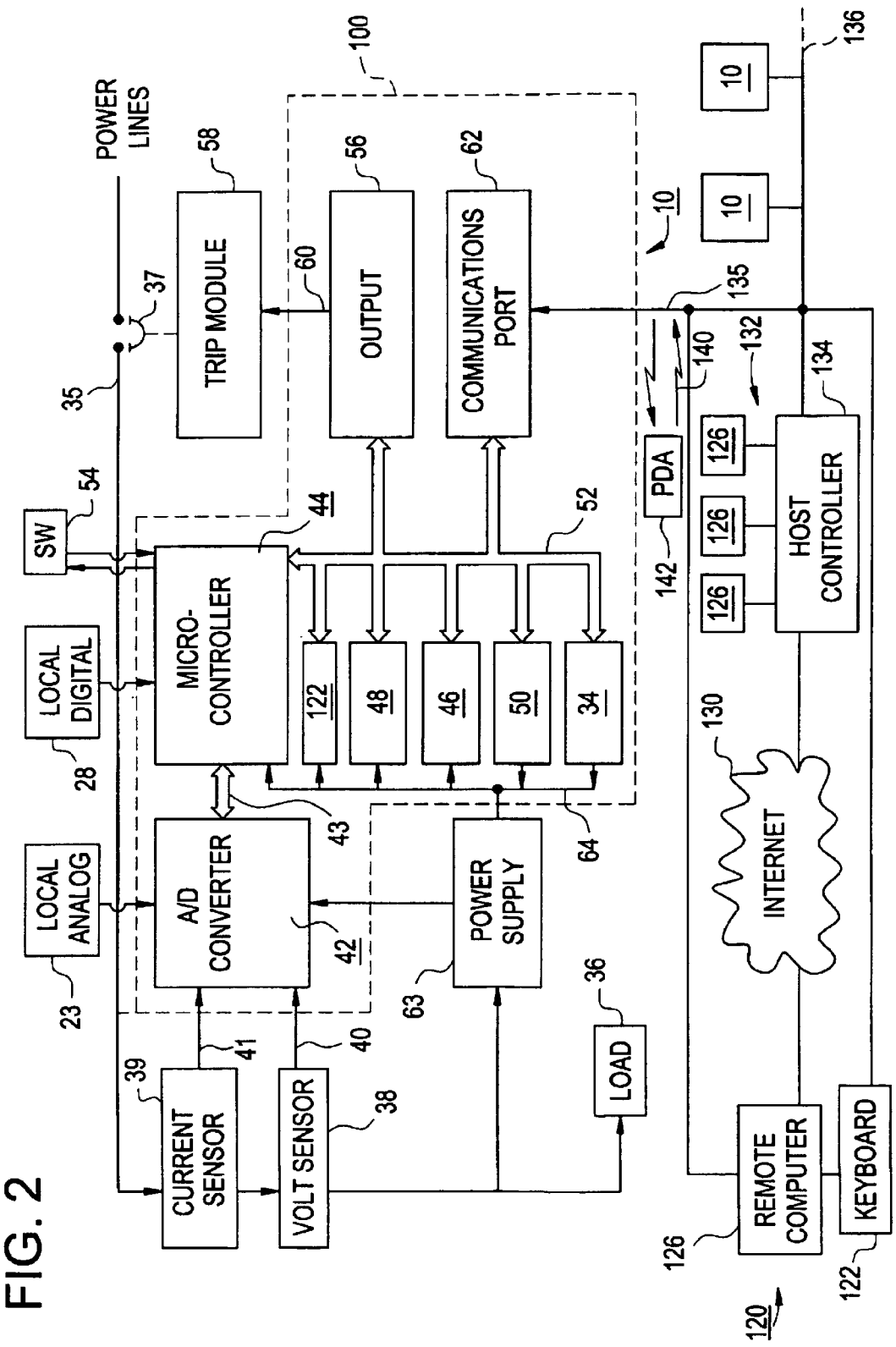
FIG. 2 is a schematic block diagram of an exemplary embodiment of an electronic trip unit.

Referring to FIG. 2, a general schematic of an electronic trip unit of the present invention is generally shown at 10. Power passes along power lines 35 to load 36. Circuit breaker contacts 37, shown in the open position are normally in the closed position so that power can pass to load 36. Voltage sensor 38 and current sensor 39 sense voltage and current in power lines 35 and provide analog signals indicative of voltage and current measurements on signal lines 40 and 41, respectively. The present disclosure is not limited to requiring that both voltage and current sensors be present, but instead contemplates that either type of sensor, or any other sensor capable of sensing a fault condition of load 36 may be employed.

The analog signals on lines 40 and 41 are presented to a signal converter, such as an A/D (analog/digital) converter 42, which converts these analog signals to digital signals. The digital signals are transferred over datapath 43 to a microcontroller (microprocessor or signal microprocessor) 44, such being commercially available from the Hitachi Electronics Components Group (Hitachi's H8/300 family of microcontrollers). Trip unit 10 further includes RAM (random access memory) 46, ROM (read only memory) 48 and EEPROM (electronic erasable programmable read only memory) or flash memory (including sector erasable flash memory) 50 all of which communicate with the microcontroller 44 over a control bus 52. It will be appreciated that A/D converter 42, ROM 48, RAM 46, or any combination thereof may be internal to microcontroller 44, as is well known. EEPROM 50 is non-volatile so that system information and programming will not be lost during a power interruption or outage. Data, typically status of the circuit breaker, is displayed by the display 34 in response to display signals received from microcontroller 44 over control bus 52. The display 34 is also capable of displaying a trip setting value selected and indicate from which input source/storage device the trip setting value is obtained. An input source/storage device is selected via switch 54 giving a switching instruction, switch 54 operably instructs microcontroller 44 from which source (i.e., input source or an associated storage device for an input source) to read a trip setting value from. Associated storage devices may include for example, but not limited to, different registers within non-volatile memory. An output control device 56, in response to control signals received from microcontroller 44 over control bus 52, controls a trip module 58 with a trip signal via a line 60.

FIG. 2 illustrates a trip unit processing system 100 (signal processor/microprocessor in phantom lines) that performs tripping functions corresponding to trip setting values selected. Analog dials 23, keypad 28 and communications port 62 are multiple input sources that provide a means for inputting the long delay, short delay and instantaneous trip setting values to be stored in an associated storage device for each input source receiving trip setting values. When a particular input source along with its associated storage device is selected, the trip unit processing system 100 accesses the trip setting value associated with the input source selected. The input source is selected with the switch 54 at the unit locally or remotely. A storage device stores the user selectable trip setting value for setting current magnitude and delay times. The switch 54 allows the choice between selecting a stored trip setting value through analog dials 23, acting as one storage device, or selecting other user selectable values from other storage devices described hereinafter. Other user selectable input sources for their respective associated storage devices include utilization of keypad 28 for local digital input with a display based user interface (e.g., 27) or via a communications network shown generally at 120 for inputting a trip setting value remotely.

An exemplary embodiment includes a local digital input using a display based user interface having a display 34 and a keypad 28 combination that provides a digital menu, allowing settings to either be scrolled through or chosen with keypad 28. The communications network interface 120 for remote digital input includes, but is not limited to, one of or a combination of: a direct connection to a keyboard 122, personal computer (PC) 126, a dialup connection (e.g., Internet) 130, or a local area network (LAN) 132 having a host controller 134 providing a signal 135 to the communications port 62 of signal processor 100. In addition, remote digital input further includes, but is not limited to, wireless remote control by radio frequency (RF) or infrared red (IR) signal 140 using a personal digital assistant (PDA) 142 or similar device. Remote digital control may also include using a password for such control. communications port 62 in turn provides a signal indicating a trip setting value selected via a setting of switch 54 and any trip setting value stored in local memory 136 for viewing by a remote user. When the switch 54 is set to a first position, the trip setting value that has been set, with analog dials 23 will be utilized. When the switch 54 is set to a second position, the trip setting value that has been chosen using the display based user interface 27, which value is stored in a local memory 136 within signal processor 100, is used as the trip setting value for the tripping functions. If the switch 54 is set to a third position, the trip setting value that has been selected using the communications network 120 is used for the trip setting value for the tripping functions. It should be noted that the trip setting value inputted by the communication network 120 replaces the trip setting value previously stored in local memory 136 that was stored via interface 27. Alternatively, another embodiment stores the trip setting value from the communications network 120 in another location within local memory 136 of signal processor 100. If the signal processor 100 stores the trip setting value from the communications network 120 in another location within local memory 136, the trip unit potentially has three sets of trip setting values stored therein to select from.

The switch 54 includes a user-programmed setting set locally or remotely and includes a mechanical button that allows local selection of a trip setting value stored either at the analog dials 23 or stored in local memory 136 after a trip setting value is input with either keypad 28 or communications network 120 or both. The trip unit 10 further includes an LED display (indicator), or the like, indicating which trip setting value from an associated storage device is selected. The storage device associated with the analog dials 23 is the set of dials 23 themselves from which the microcontroller 44 reads the trip setting value set by a relative position of each dial of dials 23. The storage device associated with the keypad 28 and/or communications network 120 is local memory 136 as aforementioned. In this particular embodiment, the switch 54 returns to a neutral position after switching and the indicator at the unit indicates which trip setting value stored in a particular storage device is selected, not the mechanical switch itself. This embodiment allows for switching between the trip setting values both remotely and locally, while the unit display 34 shows which trip setting value is selected, even when remotely altered. In utilizing a conventional mechanical switch (i.e., A-B switch), it is evident when viewing the face of a trip unit whether a local trip setting value is selected and which setting is selected, however, it is not feasible to remotely control a mechanical switch and a mechanical switch setting is not viewable from a remote location. In an exemplary embodiment, a mechanical switch returnable to a neutral position in operation offers local switching, while an LED display, or the like, is used in conjunction that indicates which settings are selected, while capable of remote switching. The remote switching capability allows selection of the trip setting values set via analog dials or trip setting values stored in local memory. The analog dials 23 mentioned with the switch 54 in the first position are not limited to analog dials per se, but may also provide digital outputs. In addition, analog dials may be absent altogether, where local digital input is accomplished with a local keypad and display.

The local and remote operation of switch 54 includes setting a bit set in non-volatile memory, local memory 136, that provides microcontroller 44 with an instruction of which storage device to read a trip setting value from. When power is interrupted to the trip unit, the bit set stored in the non-volatile local memory 136 representing the storage device selected via switch 54 directs the microcontroller 44 to read a trip setting value at the selected storage device when power is restored. It will be appreciated that remote operation of switch 54 is operably the same as inputting a trip setting value with communications network 120 as aforementioned for remotely switching switch 54. Furthermore, in lieu of indicators indicating which storage device is selected with switch 54, the display 34 optionally indicates the storage device selected via switch 54.

Figure 3:
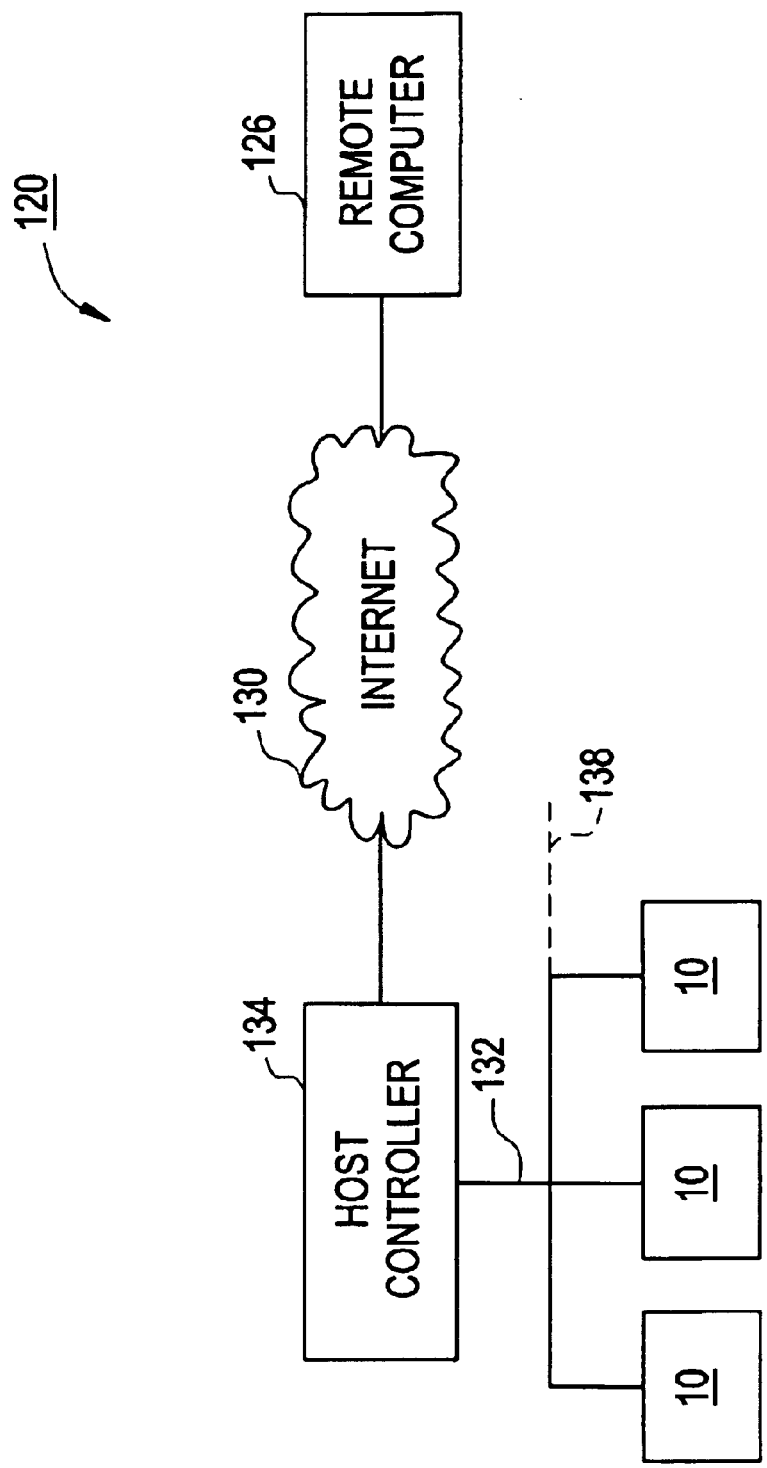
FIG. 3 is a schematic block diagram showing the trip unit's interconnectivity with a host controller and server via the Internet.

FIG. 3 shows an exemplary embodiment for remotely downloading trip setting values, as well as switching instructions for switch 54, to trip unit 10 via the communications network 120. In this embodiment, multiple trip units 10 are connected via local area network (LAN) 132 to host controller 134 which may be configured for monitoring the status of the trip units 10. Additional trip units (not shown) may be connected using connections 138. Host controller 134 is capable of downloading trip setting values to trip units 10 directly by the end users, or at the direction of remote computer 126 via the Internet 130. In this configuration, remote computer 126 can also be configured to monitor the trip unit's status which can permit a centralized or outsourced monitoring of the industrial systems and also allows servicing of trip units 10 by persons in a remote location, which can reduce down time and expense necessary to get expert personnel to the location when servicing is required.

The present invention provides thus increased functionality to trip units by enabling upgrades and servicing of the trip unit by downloading replacement trip setting values to it and having multiple operational parameters (trip setting values) available. Having one trip setting value set on the analog dials and another set in local memory allows a user not comfortable with setting the trip unit by digital means to alter the trip setting value with the analog dials at the trip unit. In the event the circuit breaker trips when the trip setting value at the analog dials is selected, the analog dials readily indicate by visual inspection the trip setting value for a breaker after tripping. Analog dials also provide trip setting means when the trip unit is not powered. Having analog with digital trip setting value capability allows setting the trip unit remotely while allowing the trip unit to default to a previously set trip setting value stored at the analog dials. This capability includes locally altering trip setting values and remotely downloading trip setting values when the electronic trip unit is connected to a host controller, such as a multi-purpose computer either directly, over the telephone lines, LAN or any other suitable connection such as the Internet.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A trip unit including a sensor for sensing a condition of a circuit providing electricity to a load and a signal converter for converting signals generated by said sensor into a digital value indicative of said condition, and further comprising:
   a first selecting means configured to select a first trip setting value from a plurality of trip setting values;
   a second selecting means configured to select a second trip setting value from said plurality of trip setting values;
   a first storage device including said first trip setting value stored therein;
   a second storage device including said second trip setting value stored therein;
   a switch configured to switch between a digital means and an analog means for selecting said first and second trip setting values; and
   a microcontroller including an output generating a trip signal in response to said digital value indicative of said condition in the circuit and one of said first and second trip setting values selected by said switch.

2. The trip unit according to claim 1 wherein said microcontroller is configured for receiving and accessing said first and second trip setting values.

3. The trip unit according to claim 1 wherein said first storage device is a first register in a non-volatile memory.

4. The trip unit according to claim 3 wherein said second storage device is a second register in said non-volatile memory.

5. The trip unit of claim 1 wherein said second storage device includes a dial disposed on said trip unit, said dial changes said second trip setting value.

6. The trip unit of claim 5 wherein said dial provides one of an analog output and a digital output representing said second trip setting value.

7. The trip unit of claim 1 wherein said switch includes a mechanical switch disposed on said trip unit indicating which one of said first and second trip setting values is selected.

8. The trip unit of claim 1 wherein said switch includes an electrical switch capable of local and remote control.

9. The trip unit of claim 1 wherein said trip unit includes an indicator indicating which one of said first and second trip setting values are selected.

10. The trip unit of claim 1 wherein said switch and at least one of said first and second storage devices are responsive to remote control and local control.

11. The trip unit of claim 10 wherein said local control includes one of a keyboard and a keypad, and said one of said keyboard and said keypad is in communication with said microcontroller.

12. The trip unit of claim 10 wherein said remote control includes a host controller, and said host controller is in communication with said microcontroller via a local area network.

13. The trip unit of claim 12 wherein said host controller is programmed for monitoring said trip unit.

14. The trip unit of claim 12 wherein said host controller is connected via an Internet connection to a remote computer such that said remote computer is capable of monitoring said trip unit.

15. The trip unit of claim 12 wherein said host controller is programmed to download trip setting values to said trip unit.

16. The trip unit of claim 12 wherein said host controller is connected via an Internet connection to a remote computer such that said remote computer is capable of downloading said trip setting values to said trip unit.

17. The trip unit of claim 10 wherein said remote control includes a host controller, and said host controller is in communication with said microcontroller via a wireless network using one of RF and IR.

18. A circuit breaker comprising:
   a set of contacts for making and breaking an electrical connection between an electrical load and an electrical power supply and a
   trip unit operably connected to said contacts, said trip unit including:
      a sensor for sensing a condition of a circuit providing electricity to said load;
      a signal converter for converting signals generated by said sensor into a digital value indicative of said condition;
      a first selecting means configured to select a first trip setting value from a plurality of trip setting values;
      a second selecting means configured to select a second trip setting value from said plurality of trip setting values;
      a first storage device configured to store said first trip setting value;
      a second storage device configured to store said second trip setting value;

a switch configured to switch between a digital means and an analog means to select said first and second trip setting values; and a microcontroller including an output generating a trip signal in response to said digital value indicative of said condition in the circuit and one of said first and second trip setting values selected by said switch.

19. The circuit breaker according to claim 18 wherein said microcontroller is configured for receiving and accessing said first and second trip setting values.

20. The circuit breaker according to claim 18 wherein said first storage device is a first register in a non-volatile memory.

21. The circuit breaker according to claim 20 wherein said second storage device is a second register in said non-volatile memory.

22. The circuit breaker of claim 18 wherein said second storage device includes a dial disposed on said trip unit, said dial changes said second trip setting value.

23. The circuit breaker of claim 22 wherein said dial provides one of a analog output and a digital output representing said second trip setting value.

24. The circuit breaker of claim 18 wherein said switch includes a mechanical switch disposed on said trip unit indicating which one of said first and second trip setting values is selected.

25. The circuit breaker of claim 18 wherein said switch includes an electrical switch capable of local and remote control.

26. The circuit breaker of claim 18 wherein said trip unit includes an indicator indicating which one of said first and second trip setting values are selected.

27. The circuit breaker of claim 18 wherein said switch and at least one of said first and second storage devices are responsive to remote control and local control.

28. The circuit breaker of claim 27 wherein said local control includes one of a keyboard and a keypad, and said one of said keyboard and said keypad is in communication with said microcontroller.

29. The circuit breaker of claim 27 wherein said remote control includes a host controller, and said host controller is in communication with said microcontroller via a local area network.

30. The circuit breaker of claim 27 wherein said remote control includes a host controller, and said host controller is in communication with said microcontroller via a wireless area network using one of RF and IR.

31. The circuit breaker of claim 30 wherein said host controller is programmed for monitoring said trip unit.

32. The circuit breaker of claim 30 wherein said host controller is connected via an Internet connection to a remote computer such that said remote computer is capable of monitoring said trip unit.

33. The circuit breaker of claim 30 wherein said host controller is programmed to download trip setting values to said trip unit.

34. The circuit breaker of claim 30 wherein said host controller is connected via an Internet connection to a remote computer such that said remote computer is capable of downloading said trip setting values to said trip unit.

35. A method of setting multiple trip setting values in a trip unit that includes a sensor for sensing a condition of a circuit providing electricity to a load and a signal converter for converting signals generated by said sensor into a digital value indicative of said condition, the method comprising:

selecting a first trip setting value from a plurality of trip setting values with a first selecting means;

selecting a second trip setting value from said plurality of trip setting values with a second selecting means;

storing said first trip setting value in a first storage device;

storing said second trip setting value in a second storage device;

switching between a digital means and an analog means to select said first and second trip setting values; and generating an a trip signal from a microcontroller in response to said digital value indicative of said condition in the circuit and one of said first and second trip setting values selected by said switch; said microcontroller is configured for receiving and accessing said first and second trip setting values.

36. The method set forth in claim 35 further comprising:

transmitting said new trip setting value over a local area network to said trip unit; and downloading said new trip setting value in one of said first and second storage devices.

37. The method set forth in claim 35 further comprising:

transmitting said new trip setting value over an Internet connection from a remote location to said trip unit; and downloading said new trip setting value in said one of said first and second storage devices.

38. A method of setting multiple trip setting values in a circuit breaker having a set of contacts for making and breaking an electrical connection between an electrical load and an electrical power supply and a trip unit operably connected to said contacts, the trip unit includes a sensor for sensing a condition of a circuit providing electricity to a load and a signal converter for converting signals generated by said sensor into a digital value indicative of said condition, the method comprising:

selecting a first trip setting value from a plurality of trip setting values with a first selecting means;

selecting a second trip setting value from said plurality of trip setting values with a second selecting means;

storing said first trip setting value in a first storage device;

storing said second trip setting value in a second storage device;

switching between a digital means and an analog means to select said first and second trip setting values;

reading said switch by a microcontroller to determine which one of said first and second storage device is selected to read from;

generating an a trip signal from said microcontroller in response to said digital value indicative of said condition in the circuit and one of said first and second trip setting values selected by said switch; said microcontroller is configured for receiving and accessing said first and second trip setting values.

39. The method according to claim 38 further comprising:

transmitting a new trip setting value over a local area network to said trip unit; and downloading said new first trip setting value in one of said first and second storage devices.

40. The method according to claim 38 further comprising:

transmitting a new trip setting value over a wireless network using one of RF and IR to said trip unit; and downloading said new first trip setting value in one of said first and second storage devices.

41. The method set forth in claim 38 further comprising:

transmitting a new trip setting value over an Internet connection from a remote location to said trip unit; and downloading said new trip setting value in one of said first and second storage devices.

42. A trip unit including a sensor for sensing a condition of a circuit providing electricity to a load and a signal converter for converting signals generated by said sensor into a digital value indicative of said condition, and further comprising:
- a first selecting means configured to select a first trip setting value from a plurality of trip setting values;
- a second selecting means configured to select a second trip setting value from said plurality of trip setting values;
- a first storage means for storing said first trip setting value therein;
- a second storage means for storing said second trip setting stored therein;
- a switching means 85 configured to switch between a digital means and an analog means for selecting said first and second trip setting values;
- a microcontroller means for generating an output trip signal in response to said digital value indicative of said condition in the circuit and one of said first and second trip setting values selected by said switching means.

* * * * *